(12) United States Patent
de Briel

(10) Patent No.: US 6,394,251 B1
(45) Date of Patent: May 28, 2002

(54) FRICTION CLUTCH WITH WEAR TAKE-UP DEVICE FOR FRICTION LININGS, IN PARTICULAR FOR MOTOR VEHICLE

(75) Inventor: Jacques Thirion de Briel, Colombes (FR)

(73) Assignee: Valeo, Paris (FR)

(*) Notice: Subject to any disclaimer, the term of this patent is extended or adjusted under 35 U.S.C. 154(b) by 0 days.

(21) Appl. No.: 09/623,108
(22) PCT Filed: Dec. 22, 1999
(86) PCT No.: PCT/FR99/03263
§ 371 (c)(1),
(2), (4) Date: Nov. 16, 2000
(87) PCT Pub. No.: WO00/39474
PCT Pub. Date: Jul. 6, 2000

(30) Foreign Application Priority Data

Dec. 29, 1998 (FR) .............................................. 98 16547

(51) Int. Cl.$^7$ .............................................. F16D 13/75
(52) U.S. Cl. ................................ 192/70.25; 192/111 A
(58) Field of Search ........................... 192/70.25, 111 A

(56) References Cited

U.S. PATENT DOCUMENTS

| | | | | |
|---|---|---|---|---|
| 3,752,286 A | * | 8/1973 | Sink ........................ | 192/111 A |
| 4,099,604 A | * | 7/1978 | Higgerson ............... | 192/111 A |
| 4,228,883 A | * | 10/1980 | Palmer .................... | 192/111 A |
| 5,029,687 A | * | 7/1991 | Asada et al. ............. | 192/111 A |
| 5,090,536 A | * | 2/1992 | Asada ..................... | 192/70.25 |
| 5,251,737 A | * | 10/1993 | Flotow et al. ........... | 192/111 A |
| 5,320,205 A | * | 6/1994 | Kummer et al. ......... | 192/70.25 |
| 5,816,379 A | * | 10/1998 | De Briel et al. ......... | 192/70.25 |
| 5,887,689 A | * | 3/1999 | Young ..................... | 192/70.25 |
| 5,937,986 A | * | 8/1999 | Schubert .................. | 192/70.25 |
| 5,944,157 A | * | 8/1999 | Blard et al. .......... | 192/70.25 X |
| 5,971,125 A | * | 10/1999 | Doremus et al. ........ | 192/70.25 |
| 6,021,877 A | * | 2/2000 | Weidinger et al. ....... | 192/70.25 |

FOREIGN PATENT DOCUMENTS

FR 2753504 3/1998

* cited by examiner

*Primary Examiner*—Saul Rodriguez
(74) *Attorney, Agent, or Firm*—Liniak, Berenato, Longacre & White

(57) ABSTRACT

A friction clutch comprises a reaction plate, a friction disc (100), bearing at its outer periphery at least a friction lining (101), a pressure plate (11), a cover (12) fixed on the reaction plate, a diaphragm (13) operating between the cover (12) and the pressure plate (11) via secondary support (17) and primary support (18), a wear take-up device comprising a ramp (14) adapted to co-operate with a counter-ramp (15), a toothing (19) wherewith co-operates a tangentially arranged endless screw (23), the ramp (14) being locked in rotation with the toothing (19), ratchet wheel (20) driving in rotation the endless screw (23) consisting of a ratchet locked in rotation with the endless screw (23) and controlled via a control tab (36) whereof the travel is limited by a so-called control stop (33), the endless screw (23) and the ratchet (20) being borne by a support (22) integral with the cover (12): the control stop (33), as well as the primary support (18), is arranged on the cover (12).

13 Claims, 5 Drawing Sheets

FRICTION CLUTCH WITH WEAR TAKE-UP DEVICE FOR FRICTION LININGS, IN PARTICULAR FOR MOTOR VEHICLE

BACKGROUND OF THE INVENTION

1. Field of the Invention

The present invention relates to a friction clutch, in particular for a motor vehicle, and relates more particularly to a clutch which is equipped with a device for compensating for the wear which is due, in particular, to wear in at least one friction liner, the said device, hereinafter referred to as a wear take-up device, operating in accordance with the wear that takes place in the liner or liners.

2. Description of Related Art

A conventional friction clutch generally includes a reaction plate, which may be divided into two parts so as to constitute a damping flywheel or a flexible flywheel, which is mounted on, and rotatable with, a first shaft which is conventionally a driving shaft such as the crankshaft of the internal combustion engine, and supporting through its outer periphery a cover plate to which at least one pressure plate is attached.

The pressure plate is fixed to the cover plate and reaction plate for rotation with them, while being displaceable axially under the biasing action of axially acting clutch engaging means controlled by declutching means; the clutch engaging means may consist of helical springs, or of one or two Belleville rings mounted in series or in parallel and subjected to the action of declutching levers which constitute the declutching means; generally, the clutch engaging means and the declutching means are both part of the same component, for example a metallic diaphragm which bears on the cover plate; the diaphragm may be mounted in series or in parallel with a Belleville ring for providing assistance to the declutching force.

A friction disc, carrying at least one friction liner at its outer periphery, and being fixed to and rotatable with a shaft which is conventionally a driven shaft such as the input shaft of the gearbox, is interposed between the pressure plate and the reaction plate so as to be gripped between them when the clutch is in its engaged condition. The clutch engaging means control the axial displacement of the pressure plate when they are actuated by a clutch release bearing through the declutching means. Most commonly, the friction disc comprises an axially resilient support disc, on either side of which there are fixed two friction liners. The friction disc is thereby gripped progressively. In another version the support disc is rigid.

In the course of the working life of such a clutch, the friction liner or liners and the components with which they cooperate, namely the pressure plate and reaction plate, become worn, and this causes variation in the position of the pressure plate and the positions of the axially acting clutch engaging means and the clutch release bearing, from which it follows that there is a variation in the gripping force between the friction disc on the one hand and the pressure and reaction plates on the other, because the working conditions of the declutching means are modified, and the force necessary to disengage the clutch is thereby affected. The equipping of such a clutch with a wear take-up device avoids these disadvantages, and the clutch engaging means, as well as the clutch release bearing, which are conventionally in constant engagement on the declutching means, occupy the same position when the clutch is in its engaged condition.

It is known to provide a friction clutch, in particular for a motor vehicle, of the kind comprising a reaction plate adapted to be mounted on a driving shaft for rotation with the latter, a friction disc, carrying at its outer periphery at least one friction liner and arranged to be mounted on a driven shaft for rotation with the latter, a pressure plate, a cover plate fixed on the reaction plate, axially acting clutch engaging means which are controlled by declutching means and which act between, firstly, the cover plate and, secondly, the pressure plate through secondary abutment means and primary abutment means, the pressure plate being fixed with respect to the cover plate for rotation with the latter while being displaceable axially with respect to it and being subjected to the action of resilient return means biasing the pressure plate axially towards the cover plate, the said clutch further including a wear take-up device including ramp means, the ramps of which are disposed circumferentially, the ramp means being located axially between the abutment means and the pressure plate and adapted to cooperate with counter ramp means, a set of teeth with which a tangentially disposed worm cooperates, the ramp means being fixed to the said set of teeth for rotation therewith, means being provided for driving the worm in rotation and being rendered operational by wear in the friction liner or liners when the clutch is engaged, the said worm driving means comprising a ratchet wheel fixed in rotation to the worm and controlled through a control tongue, the course of travel of which, with respect to the ratchet wheel during the declutching operation, is limited by a so-called control abutment, the worm and the means for driving the worm in rotation being carried by a support member which is fixed to the cover plate.

A clutch of this kind is described for example in the document FR-A-2 753 503.

In that document, the clutch engaging means consist of a diaphragm which is in cooperation with a primary abutment carried by the base portion of the cover plate, and which has at its outer periphery a radial finger through which it is caused to cooperate with the control tongue; the control abutment which limits the course of travel of the control tongue is carried by the support member fixed to the cover plate.

As has already been mentioned above, the wear take-up device ensures that the clutch engaging means, in this case the diaphragm, will be in the same position of engagement regardless of the state of wear, namely the position which it occupied in the new state when it was fitted on the vehicle; it is well understood to be important that this position, which is called the nominal position, should correspond to the exertion of a desired force, referred to as the nominal force, by the diaphragm on the pressure plate in the engaged condition; the position of the diaphragm, which in practice means its inclination, is clearly fixed by those of the primary and secondary abutments on which its outer portion, in the form of a Belleville ring, is in engagement; the primary abutment is carried by the cover plate and the position of the secondary abutment is a function of the positioning of the ramp means with respect to the counter-ramp means. The positioning is obtained by the regulation function, which is itself provided by the assembly consisting of the ratchet wheel, the worm and the control tongue which is adapted for cooperation with the control abutment.

This assembly is part of a cassette which is provided with a specific support member for mounting the above mentioned assembly.

For putting the diaphragm in its nominal position, the mechanism is associated with a virtual friction disc by simulating wear of the liners, and a certain number of clutch engagement and disengagement operations are carried out until the control tongue, engaging on the control abutment, no longer jumps over a tooth of the ratchet wheel, the secondary abutment of the diaphragm being then correctly positioned; thus, the nominal position of the diaphragm depends on both the primary abutment and the control abutment.

As has been seen, the mechanism of the clutch is constructed by assembling various components together; these components are manufactured, and their assembly is carried out, with certain tolerances; this affects the precision of the relative positioning of the primary abutment and control abutment when these latter are formed on two different components as is the case in the document cited above, in which the primary abutment is carried by the cover plate and the control abutment by the support member assembled to the cover plate.

SUMMARY OF THE INVENTION

An object of the present invention is to overcome this drawback.

DETAILED DESCRIPTION OF THE PREFERRED EMBODIMENTS

Thus, according to the invention, a clutch of the type described above is characterised by the fact that the control abutment, like the primary abutment means, is arranged on the cover plate.

This makes it easy to obtain precise positioning of the control abutment with respect to the primary abutment means, especially where the primary abutment means are made in the form of circumferential elements press-formed in the base portion of the cover plate, the primary abutment means and the control abutment being formed in the same operation of fabricating the cover plate.

Preferably, the control abutment consists of at least one lug formed by stamping in the base portion of the cover plate. Ventilation of the clutch is improved by the hole formed in pressing out the lug.

In another version, the control abutment consists of at least one boss press-formed in the base portion of the cover plate. This operation is very easy to perform. In all cases, it is of advantage to provide, for a given cover plate and different applications, a means for enabling the height (i.e. the size) of the control abutment to be adjusted so as to obtain different adjustments of the position of the diaphragm.

Such a means may be formed directly in the press by partial modification of the press and calibrating tools.

In another version this is achieved by machining the height of the control abutment.

Preferably, the axially acting clutch engaging means consist of a diaphragm.

In a preferred embodiment, the primary abutment means consist of a circumferential press-formed element, of continuous or divided form, in the base portion of the cover plate; in this case, the common fabrication operation in which the cover plate is formed is a press-forming operation where the control abutment is a press-formed element.

Preferably, the ratchet wheel is controlled by the diaphragm through the control tongue; the ratchet wheel is controlled by an actuator element consisting of a finger formed on the diaphragm at its outer periphery; two lugs or bosses are provided, extending radially and spaced apart circumferentially by a passage for the actuator element.

In another embodiment, the control abutment consists of a lug formed by stamping out in the base portion of the cover plate, which lug includes an end portion which extends axially and passes through a hole in the diaphragm.

Preferably, the ramp means consist of an annular ring which includes, axially on one side, the ramps, which are inclined and spaced apart circumferentially, and, on the other side, the secondary abutment means.

Preferably, the counter-ramp means consist of pads adapted to cooperate with the ramps of the ramp means.

Advantageously, the worm is mounted for displacement along its axis, being subjected to the action of a resilient so-called take-up means.

In order to enable the subject matter of the invention to be understood, embodiments which are shown in the attached drawings will now be described, by way of purely illustrative and non-limiting example.

BRIEF DESCRIPTION OF THE DRAWINGS

In the drawings:

With reference to FIGS. 1 to 3, these show a friction clutch mechanism, especially for a motor vehicle, which includes a pressure plate 11 which is arranged to cooperate with a friction disc 100 shown diagrammatically in FIG. 1 in phantom lines, and which consists of a clutch plate or support disc, which, in this example, carries at its outer periphery friction liners 101 and itself cooperates with a reaction plate. The friction disc 100 in this example is of the progressive type, in which an axial elasticity operates in a known way between the support disc and the friction liners 101. The reaction plate, which is not shown, is arranged to be mounted on, and rotatable with, a driving shaft such as the crankshaft of the internal combustion engine. The friction disc 100 is fixed to, and rotatable with, a driven shaft such as the input shaft of the gearbox, through an interposed hub which is carried by the clutch plate at its inner periphery.

The pressure plate 11, which is of mouldable material, and is a casting in this example, is fixed to, and rotatable with, a hollow cover plate 12, by means of tangential tongues which, being elastic axially, also act as return means for the pressure plate 11, biasing it towards the cover plate 12, which is hollow and press-formed in metal. The cover plate 12 in this example is in the form of a hollow dish.

Figure 1:
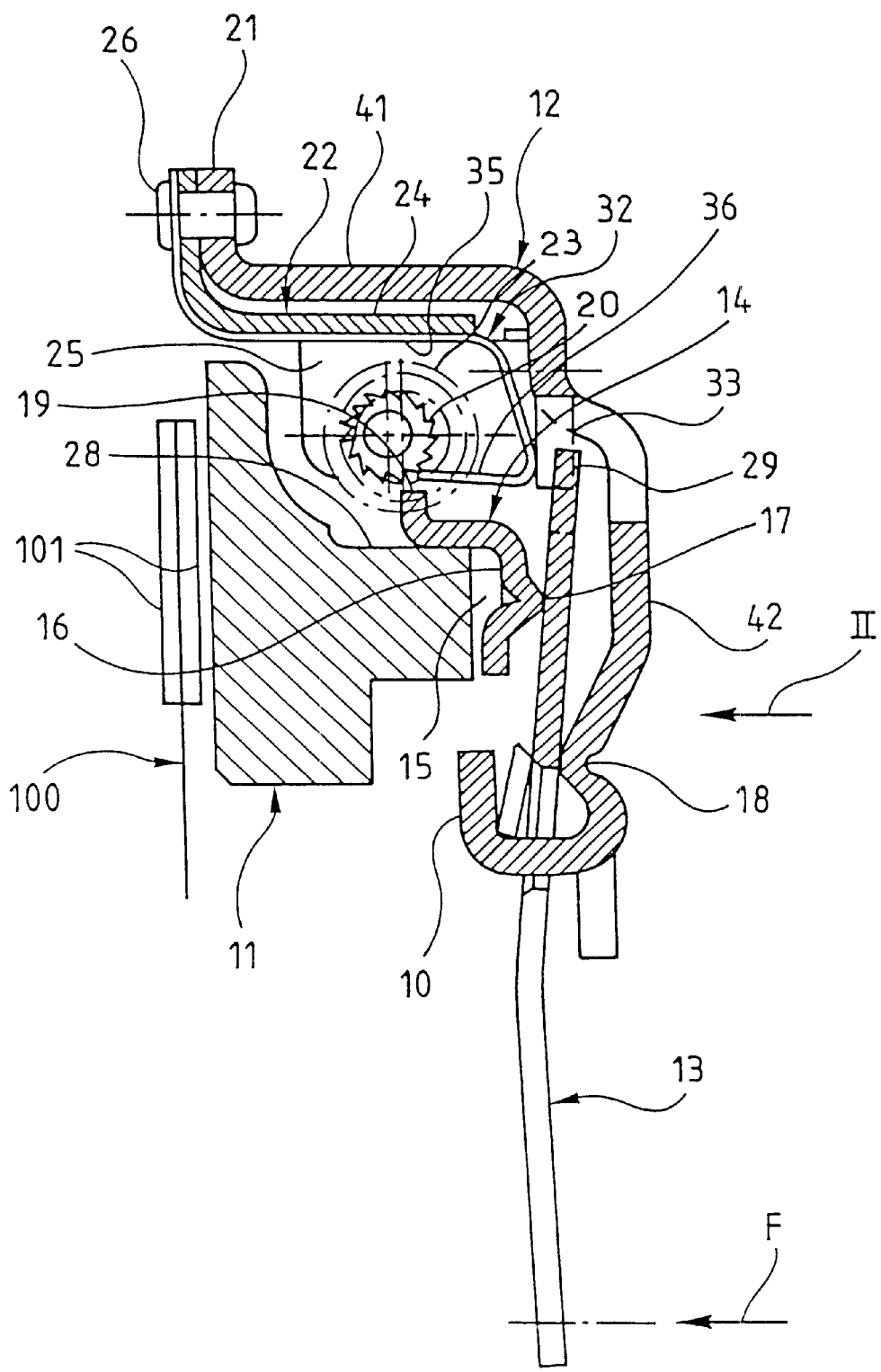
FIG. 1 is a partial view in cross section of a clutch according to the invention, equipped with a wear take-up device.

The pressure plate 11, while being fixed with respect to the cover plate 12 for rotation with the latter, is displaceable axially with respect to the cover plate 12 under the biasing action of controlled, axially acting, resilient means which in this example consist of a diaphragm 13 articulated on the cover plate 12 by means of lugs 10 projecting from the inner periphery of the base portion 42 of the cover plate 12, together with press-formed elements 18 formed as circular arcs in the base portion 42 of the cover plate 12 and offering a primary abutment to the diaphragm 13, the clutch being in this example of the push-to-release type, in which the declutching operation is effected by action on the ends of the fingers of the diaphragm 13 in the direction of the arrow F in FIG. 1, in which the clutch is shown disengaged. More precisely, the lugs 10 engage in this example on a crown ring (not given a reference numeral) in such a way that the diaphragm is articulated between the primary abutment 18 and the outer periphery of the crown ring, so that the diaphragm is able to be urged elastically against the primary abutment 18.

In order, when the clutch is engaged, to maintain the axially acting resilient means 13 in a position which is independent of wear in the liners 101 of the friction disc 100, and, to a lesser extent, wear in the pressure plate 11 and the reaction plate, the so-called friction faces of which become worn in contact with the liners 101 of the disc 100, a wear take-up device is provided, which includes ramp means 14 provided with ramps 16 disposed circumferentially; more precisely, the ramp means 14 consist of an annular ring which has ramps 16 disposed circumferentially on its face that faces towards the pressure plate 11; on its opposite face, the said annular ring has a so-called secondary abutment zone 17 which consists of a rounded edge at the top, disposed in a circular arc which is centred on the axis of the clutch. The said secondary abutment zone 17 can of course be either continuous or discontinuous. The abutment 17 is located radially inwards of the primary abutment 18.

The pressure plate 11 has, on its face that faces towards the base portion 42 of the cover plate 12, a transverse engagement surface which carries counter-ramp means 15 which are in the form of pads in this example, and which are spaced apart circumferentially by a distance that corresponds to the circumferential distance separating two successive ramps 16, each of the counter-ramps 15 being arranged to cooperate with one ramp 16.

The ramp means 14 are located axially between the diaphragm 13 and the counter-ramp means, so that the counter-ramps 15 receive the ramps 16, and so that the diaphragm 13 is in cooperation with the secondary abutment zone 17, which therefore constitutes an abutment means whereby the diaphragm 13 acts on the pressure plate 11.

The outer periphery of the ramp means 14 is provided with an integral set of teeth 19. In this example the set of teeth 19 is formed by a cutting-out operation in an edge of a press-formed and bent metal plate which constitutes the ramp means 14. The engagement surface of the pressure plate 11 in which the pads 15 are formed has a circumferential cylindrical flange 28, on the outer periphery of which the ramp means 14, in the form of an annular ring formed in the zone 17, are centred.

The wear take-up device also includes a ratchet wheel 20 with inclined teeth, which is mounted for rotation about a pivot pin 27 which also carries a worm 23; the thread and the pitch of the worm 23 are matched to the set of teeth 19 of the ramp means 14; the worm 23 is adapted to cooperate with the set of teeth 19 under the conditions which will be described later herein.

The pivot pin 27 is carried for rotation by a support member 22 of press-formed and bent sheet metal having the general form of a U, with a spine portion 24 and two wing portions 25 which are adapted to support the pivot pin 27; the support member 22 is fixed by means of its spine portion 24 and its wing portions 25, in this case by rivets 26 and by virtue of lugs which are formed on them, to the cover plate 12 at the outer periphery of the latter, radially inward of the abutment zone 18, by means of a press-formed element formed so as to project outwards in the skirt 41 of the cover plate 12.

The worm 23 and the ratchet wheel 20 may be integral with each other; the worm 23 could of course be a separate component and may be formed with a bore, the said bore and the pivot pin 27 itself being arranged in such a way that the worm 23 is able to slide along the pivot pin 27, while being fixed to the said pivot pin 27 for rotation with it.

A resilient member 32, which in this case is of metal and thinner than the support member, having in axial cross section the general form of a U, includes two axially orientated wing portions 35, 36, the purpose of one wing portion 35 being to fasten it, in this example by means of two of the rivets 26 which secure the support member 22, on a transverse flange 21 of the cover plate 12 which terminates its skirt 41 and is generally parallel to its base portion 42; the other wing portion 36 of the resilient member 32 is formed as a control tongue, and in this example it extends generally parallel to the axis of the clutch; when the resilient member 32 and the ratchet wheel 20 are mounted on the cover plate 12, the control tongue 36 is in elastic cooperation with the foot of a tooth of the ratchet wheel 20. The elastic member 32 is fitted beneath the spine portion 24 of the support member 22, in contact with the latter.

A helical compression spring 46, which constitutes the resilient take-up means as described below, is mounted around the pivot pin 27; in this example the spring 46 is located axially between the ratchet wheel 20 and one wing portion 25 of the support member 22.

Figure 2:
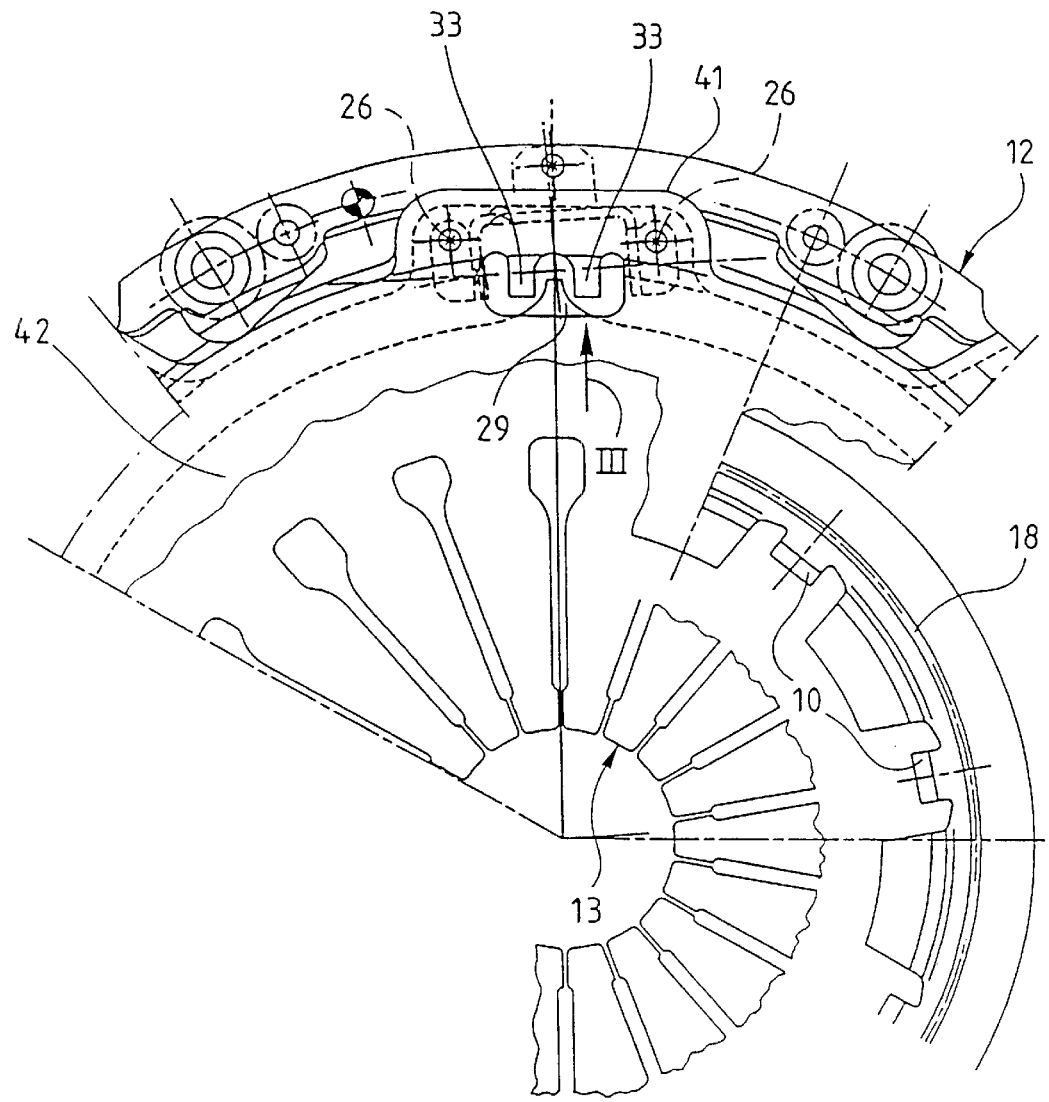
FIG. 2 is a view of the clutch shown partly cut away, seen in the direction of the arrow II in FIG. 1.

Since the support member 22, carrying the ratchet wheel 20, the worm 23 and the helical spring 46, is fixed with respect to the cover plate 12, the diaphragm 13 is displaced with respect to it, and therefore with respect to the control tongue 36, during the declutching and re-engagement operations of the clutch; the diaphragm 13 carries at its periphery a radial finger, referred to as an actuator element, 29, FIGS. 1 and 2, which projects radially outside the Belleville ring portion of the diaphragm 13 so as to cooperate with the control tongue 36 of the resilient member 32; it will be understood that because of this arrangement, during tilting of the diaphragm 12 in operations to re-engage the clutch, the diaphragm displaces the control tongue 36 from right to left with reference to FIG. 1, and by cooperation with the teeth of the ratchet wheel 20, the end of the control tongue 36 is caused to rotate the ratchet wheel 20 clockwise; during declutching, the elasticity of the resilient member 32 and the inclination of the teeth on the ratchet wheel 20 cause the control tongue 36 to mount on the teeth of the latter.

The wear take-up device just described operates in the following way.

Figure 4:
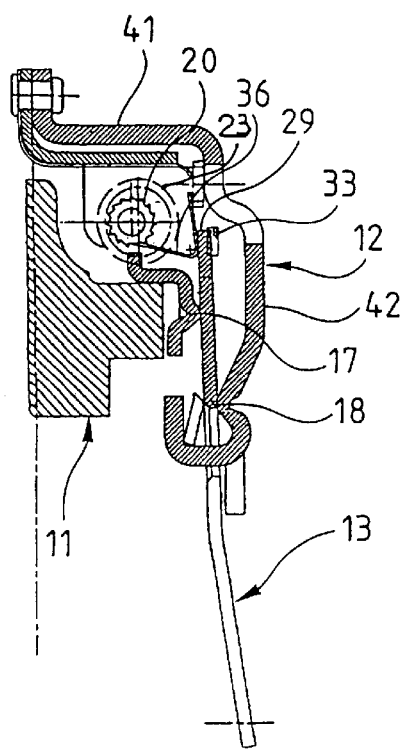
FIGS. 4 and 5 show diagrammatically, in cross section, the clutch of FIGS. 1 to 3 in its engaged condition in FIG. 4, and its disengaged condition in FIG. 5, with the friction liners being in their new state.

FIG. 4 shows diagrammatically the clutch in its engaged condition, the liners 101 of the friction disc 100 being in a new condition and gripped between the reaction plate, not shown, and the pressure plate 11. In this position, the control tongue 36 has its end on the foot of one tooth of the ratchet wheel 20.

Figure 5:
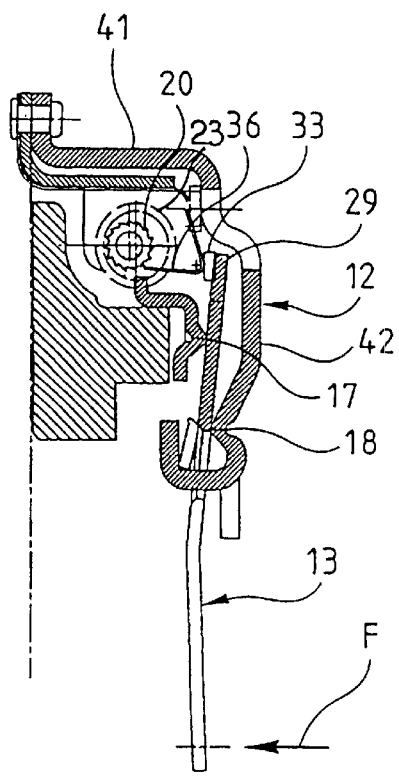

When the clutch is disengaged, FIG. 5, the ends of the fingers of the diaphragm 13 are urged in the direction of the arrow F away from the base portion 42 of the cover plate 12;

the diaphragm 13 tilts about the primary abutment 18 under the resilient gripping action exerted by the crown ring; in this displacement; the outer periphery of the diaphragm 13 progressively releases the pressure plate 11 and its actuator element 29 from the control tongue 36, respectively; the end of the control tongue 36 follows the inclined ramp defined by the tooth at the foot of which it was lying in the preceding step, the teeth of the ratchet wheel 20 being made such that, during this declutching process with new liners, the end of the control tongue 36 does not jump over a tooth; this is achieved by the resilient element 32, and therefore its control tongue 36, coming into abutment against a so-called control abutment 33 of the cover plate 12; in this example, the control abutment 33 consists of at least one radial lug projecting from the base portion 42 of the cover plate 12 and formed by stamping and bending; preferably and with advantage, as can be seen best in FIG. 2, there are two radial lugs 33 spaced apart circumferentially for passage of the actuator 29 between them.

The stamping and bending operation forms an aperture for ventilating the clutch.

In FIG. 4, the diaphragm 13 is in its nominal position, which is obtained as described at the beginning of this description, with precision due to the fact that, in accordance with the invention, the control abutment defined by the radial lugs 33 and the primary abutment 18 of the diaphragm 13 are precisely positioned with respect to each other, in particular in the axial sense, because they are part of the same component, namely the cover plate 12; in addition, experience shows that the number of operations of engaging and disengaging the clutch which are necessary to put the diaphragm 13 in its preliminary nominal position is reduced.

Figure 6:
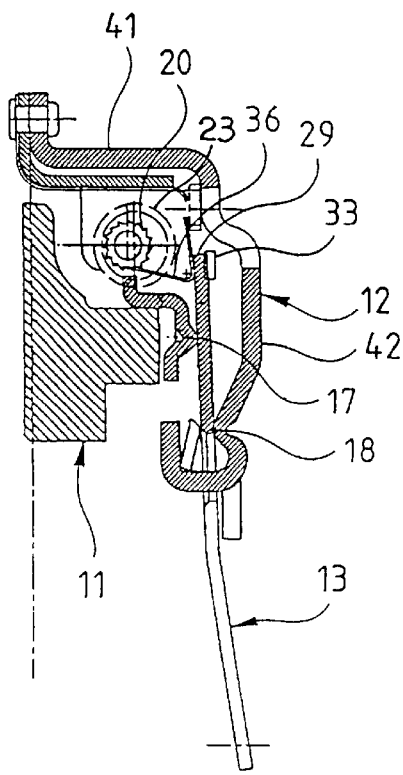
FIGS. 6 and 7 are similar to FIGS. 4 and 5 respectively, but with the friction liners in a worn condition.

When the liners become worn, and as is well known, the pressure plate 11, which is always being subjected to the axial force from the diaphragm 13, moves closer to the reaction plate which is fixed axially as is the cover plate 12; the actuator 29 of the diaphragm 13 then comes closer to the reaction plate, carrying in its movement the control tongue 36, FIG. 6; the ratchet wheel 20 rotates about its axis in the clockwise direction; this driving of the ratchet wheel 20 in rotation causes the worm 23 also to rotate on its axis; since the ramp means 14 are immobilised against rotation due to the force exerted by the diaphragm 13, the worm 23 which meshes with the set of teeth 19 tightens somewhat on the said set of teeth 19, so compressing the helical spring 46, the direction of the thread of the worm 23 being such that this will be the case.

Figure 3:
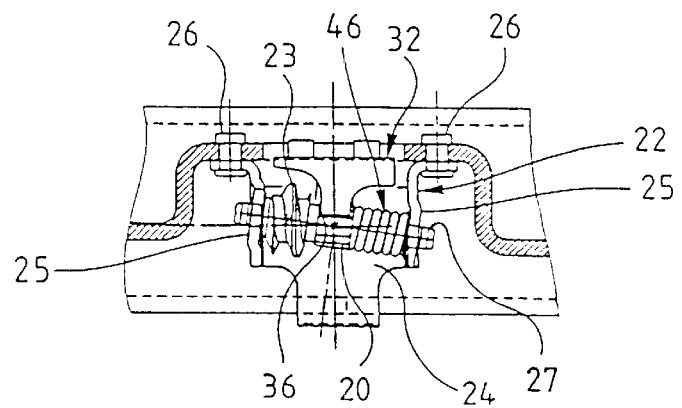
FIG. 3 is a partial view seen in the direction of the arrow III in FIG. 2.
Figure 7:
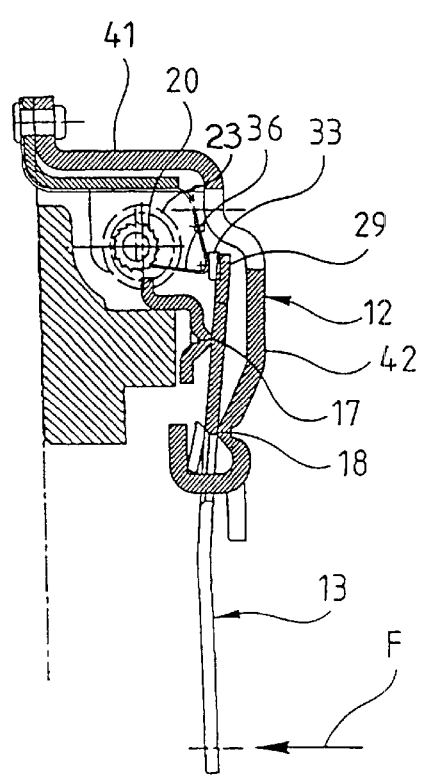

During the declutching operation which follows the phase of wear just described, the pressure plate 11 releases the liners 101, moving further away from them under the action of the tangential tongues which return, towards the base portion 42 of the cover plate 12, the pressure plate 11 and the ramp means 14, which are in contact with the diaphragm 13 through their secondary abutment zones 17 and with the pad 15 through their ramps 16, FIG. 7. The helical spring 46 urges the worm 23 towards the wing portion 25 of the support member 22, from which it is spaced away during wearing phases, that is to say from right to left with reference to FIGS. 2 and 3; since the force exerted by the diaphragm 13 is no longer applied on the ramp means 14, the only force to be overcome in order that these ramp means 14 can be made to turn with respect to the pressure plate 11 is the return force of the tangential tongues; if the force exerted by the helical spring 46 is sufficiently large to overcome this force, then the spring 46 displaces the worm 23, which is prevented from turning on itself by the pressure from the control tongue 36, and the worm will drive the set of teeth 19: by turning on themselves, the ramps 16, by cooperation with the relatively fixed pads 15, will take the pressure plate 11 further away from the base portion 42 of the cover plate 12, thereby increasing the axial distance between the working face of the pressure plate 11 and the secondary abutment zones 17 of the ramp means 14, so that at least part of the displacement of the pressure plate 11 which is due to wear in the liners 101 is taken up. Since the load exerted by the helical spring 46 is a function of the amount by which it will have been compressed by the worm 23 during the wearing phases, it can be seen that several clutch engaging and disengaging operations may have to take place before the device for taking up clearance enters the wear take-up phase proper, this being a function of the relative dimensioning of the components concerned.

If the amount of wear has been enough for the ratchet wheel 20 to have rotated sufficiently to enable the control tongue 36, the course of return travel of which is limited by the control abutment 33, FIG. 7, to jump one tooth on the return stroke, then during the next clutch engaging operation the control tongue 36 rotates the ratchet wheel 20, and the ramp means 14, no longer gripped by the diaphragm 13, rotate and take up the wear; at the end of this take-up operation, in the engaged condition of the clutch, the diaphragm 13, the ratchet wheel 20 and the control tongue 36 regain the position that they occupied in FIG. 4.

Figure 8:
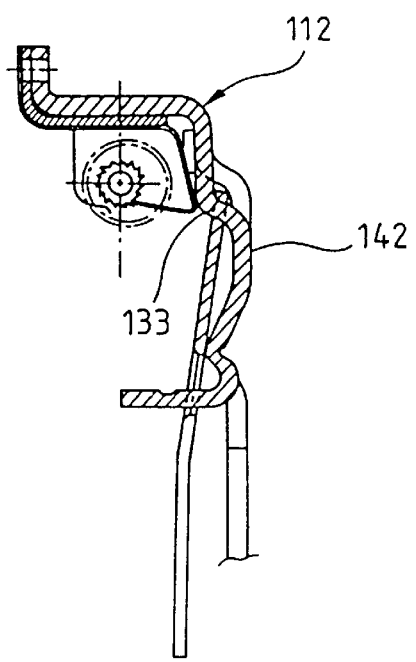
FIGS. 8 and 9 are similar to FIGS. 1 and 2 and show another version, of which only the cover plate and the support member with which it is equipped are shown.
Figure 9:
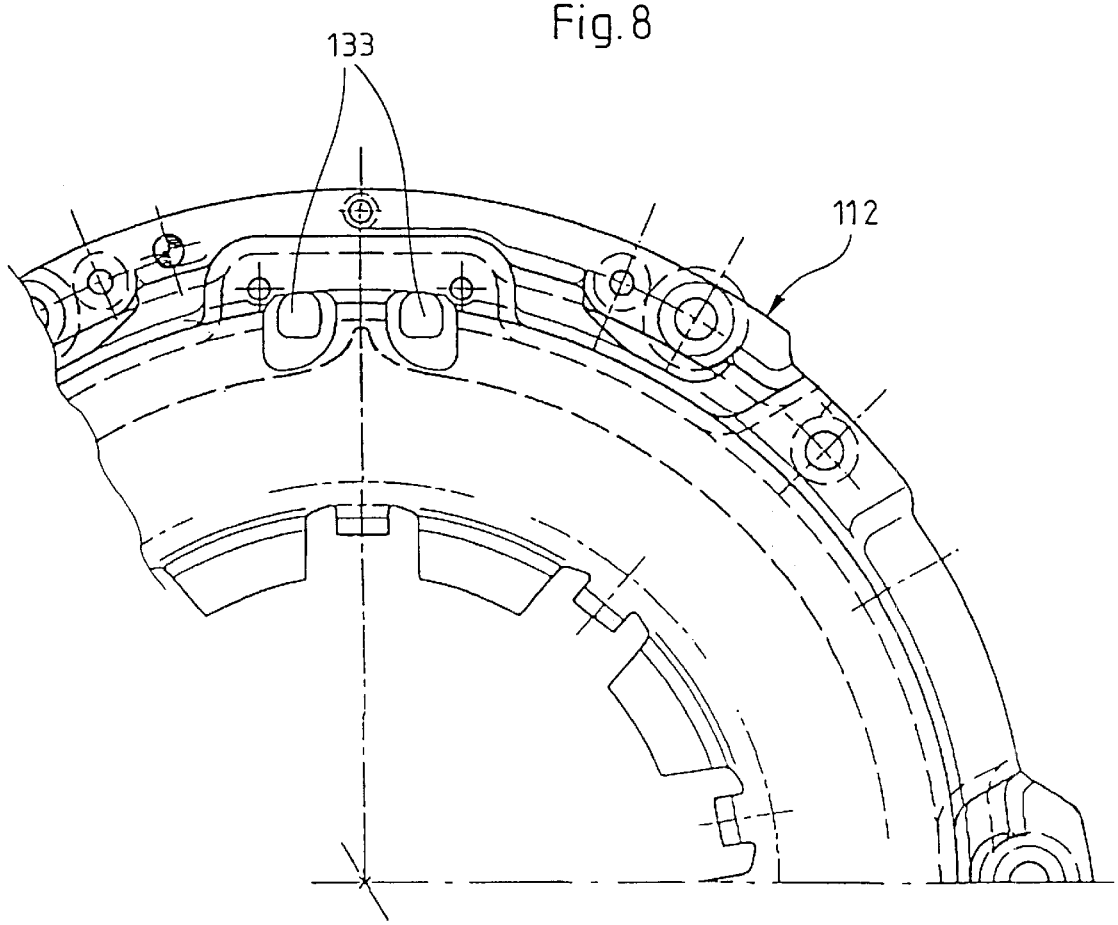

FIGS. 8 and 9 show another version of the control abutment; in this case, the base portion 142 of the cover plate 112 is provided with two press-formed bosses 133 which extend radially and between which there is a passage for the actuator finger of the diaphragm; in FIG. 8, the lugs 110 are shown before being bent. In this embodiment, the precision with which the control abutment and the primary abutment of the diaphragm are positioned in relation to each other, in particular axially, is ensured by the fact that these two components are made in a single operation of press-forming the base portion 142 of the cover plate 112.

Depending on the application, in all the embodiments it is possible to machine the control abutment so as to improve adjustment, or, in the press, to adjust the position of the control abutment with the aid of a press tool. The primary abutment 18 and the control abutment are preferably formed in the same pressing operation.

Figure 10:
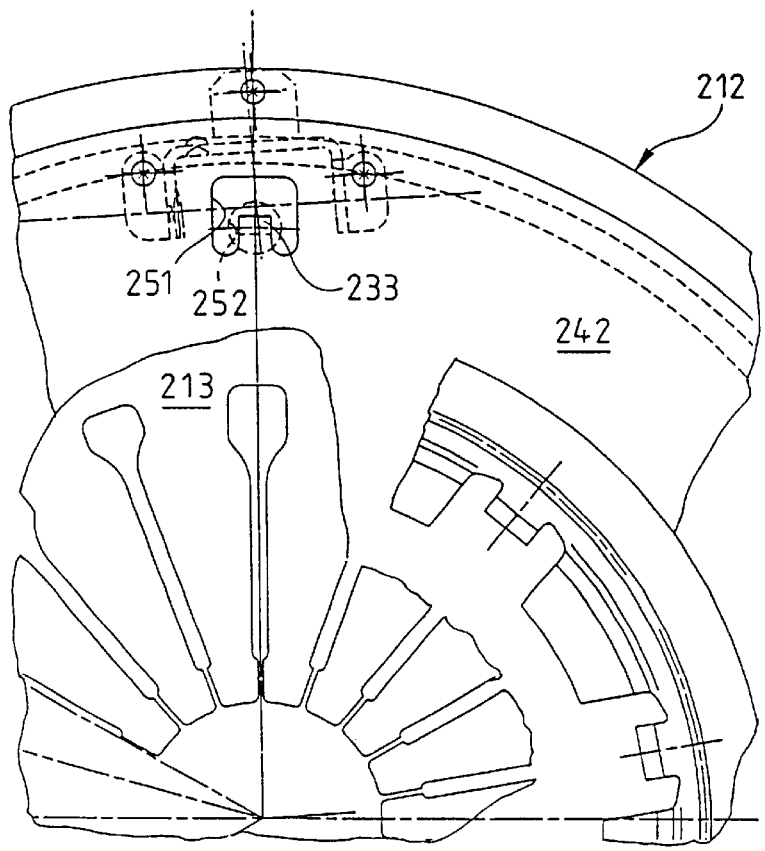
FIGS. 10 and 11 are similar to FIGS. 9 and 8 respectively, and show a further version.
Figure 11:
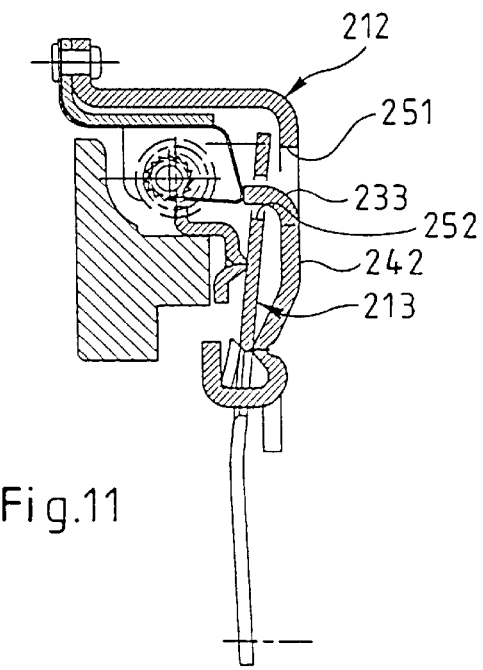

In the further version shown in FIGS. 10 and 11, the diaphragm 213 is of large diameter, and it is its peripheral portion, in the form of a Belleville ring, that acts on the control tongue; the control abutment 233 consists of a lug which is stamped out in the base portion 242 of the cover plate 212, the end of the said lug extending axially through a hole 252 in the diaphragm 213; in this example, the lug 233 projects from the base portion 242 of the cover plate 212 through a cut-out 251 formed in the said base portion 242, so as to extend from the edge of the cut-out 251 situated closest to the axis.

Figure 12:
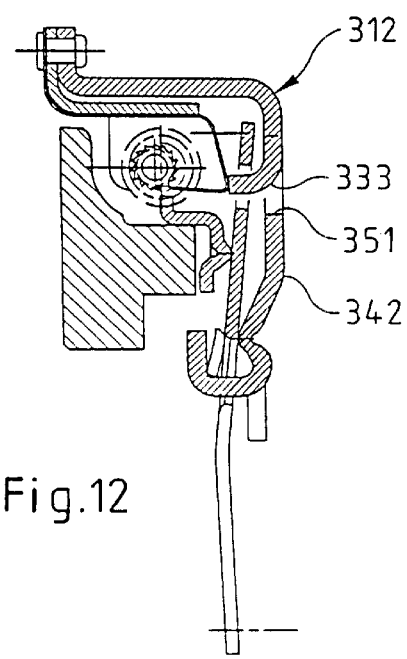
FIG. 12 is similar to FIG. 11 and shows yet another version.

In the version shown in FIG. 12, the lug 333 which extends axially through a hole in the diaphragm projects from the base portion 342 of the cover plate 312, from the edge of a cut-out 351 furthest away from the axis. It will be noted that in FIGS. 10 to 12, the radial finger of the diaphragm is omitted, and that the outer periphery of the Belleville ring portion of the diaphragm 213 has a larger diameter than in FIGS. 1 to 8. The holes in the diaphragm are preferably formed in the neutral zone of the Belleville ring portion of the diaphragm.

Thanks to these arrangements, the characteristic curve of the diaphragm is able to have a more pronounced peak, so that the characteristic curve of the diaphragm is better able to match the characteristic curve of the above mentioned axial elasticity of the friction clutch.

It will be noted that the formation and adjustment of the position of the control abutment 233, 333 are easier to obtain.

The lugs and the crown ring can of course be replaced by bars with profiled heads which offer an abutment in facing relationship to the primary abutment 18. Any other tilting means may be envisaged.

In another version, the set of teeth 19 is part of a component distinct from the ramp means. This intermediate component has, at its inner periphery, teeth which penetrate into openings formed in the axially orientated annular flange formed in the ramp means beyond the secondary abutment 17. This flange (not given a reference numeral) is in cooperation with the cylindrical flange 28. The set of teeth is thus fixed with respect to the ramp means 14 for rotation with the latter, while being displaceable axially with respect to the latter by means of a coupling of the tenon and mortice type, in the manner described in FIGS. 1 to 9 of French patent applications FR 98 11991 and FR 99 09974, filed on Sep. 23, 1998 and Jul. 30, 1999 respectively.

The intermediate component is of course located axially on the cover plate, for example by means of extensions of two axially elastic tongues which couple the pressure plate 11 to the cover plate 14 for rotation together with axial mobility.

In another version, the axially elastic tongues couple the intermediate component with the ramp means for rotation together, as can be seen best in FIGS. 22 to 40 of the above mentioned application FR 99 09974.

In the light of FIGS. 48 and 49 of the said application FR 99 09974, it can be seen that the elastic member 32 is, in a modified version, fitted above the support member 22, being in contact with the spine portion 24 of the latter, which enables the length of the control tongue to be increased and therefore enables the accuracy of the wear take-up device to be improved.

The elastic member 32 is preferably fixed to the support member 22 by means of at least one rivet formed by extrusion from the spine portion 24. For more detail, reference should be made to the said application FR 99 09974.

The helical spring 46 is preferably precompressed, so that the worm 23 is applied frictionally against a wing portion 25 of the support member 22. The precompression of the spring 46, which constitutes a resilient take-up means, is equal to six times $(P.D_p)/D_c$, where P is the weight of the pressure plate 11, $D_p$ is the base diameter of the worm 23, and $D_c$ is the mean diameter of the surface of contact of the worm 23 with the wing portion 25 of the support member 22. In a modified version, a friction ring is interposed between the worm and the corresponding wing portion 25 of the support member 22 so as to increase the friction. Similarly, in another version, friction rings are mounted at the circumferential ends of the spring 46, that is to say between the other wing portion 25 of the support member 22 and the spring 46, and between the ratchet wheel and the spring 46.

The worm 23 is of course then mounted for displacement along its pivot pin 27.

Thus, by contrast with the solutions described in the document FR-A-2 753 503, the precompressed spring 46 enables the pawl strips of the non-return ratchet to be omitted. Wear is taken up during the re-engagement operation of the clutch, with the worm still being in contact with the appropriate wing portion 25 of the support member, either directly or through a friction ring.

During the declutching operation the worm 23 is unable to rotate.

What is claimed is:

1. A friction clutch, for a motor vehicle, comprising a reaction plate adapted to be mounted on a driving shaft for rotation with the driving shaft, a friction disc (100), carrying at its outer periphery at least one friction liner (101) and arranged to be mounted on a driven shaft for rotation with the driven shaft, a pressure plate (11), a cover plate (12, 112, 212, 312) fixed on the reaction plate, axially acting clutch engaging means (13) which are controlled by declutching means and which act between, firstly, the cover plate (12, 112, 212, 312) and, secondly, the pressure plate (11) through secondary abutment means (17) and primary abutment means (18), the pressure plate (11) being fixed with respect to the cover plate (12, 112, 212, 312) for rotation with the cover plate while being displaceable axially with respect to the cover plate and being subjected to the action of resilient return means biasing the pressure plate (11) axially towards the cover plate (12, 112, 212, 312), said clutch further including a wear take-up device including ramp means (14), ramps (16) of the ramp means (14) are disposed circumferentially, the ramp means being located axially between the abutment means (17) and the pressure plate (11) and adapted to cooperate with counter-ramp means (15), a set of teeth (19) with which a tangentially disposed worm (23) cooperates, the ramp means (14) being fixed to said set of teeth (19) for rotation therewith, means (20) being provided for driving the worm (23) in rotation and being rendered operational by wear in the friction liner or liners (101) when the clutch is engaged, said worm driving means comprising a ratchet wheel fixed in rotation to the worm (23) and controlled through a control tongue (36), the course of travel of which, with respect to the ratchet wheel (20) during the declutching operation, is limited by a control abutment, the worm (23) and the means (20) for driving the worm in rotation being carried by a support member (22) which is fixed to the cover plate (12, 112, 212, 312), wherein the control abutment (33, 133, 233, 333), like the primary abutment means (18), is arranged on the cover plate (12, 112, 212, 312).

2. A friction clutch according to claim 1, wherein the control abutment (33, 233, 333) consists of at least one lug formed by stamping in the base portion (42, 242, 342) of the cover plate (12, 212, 312).

3. A friction clutch according to claim 1, wherein the control abutment (133) consists of at least one boss press-formed in the base portion (142) of the cover plate (112).

4. A friction clutch according to claim 2, wherein the axially acting clutch engaging means consist of a diaphragm (13, 213).

5. A friction clutch according to claim 4, wherein the primary abutment means (18) consist of a circumferential press-formed element, of continuous or divided form, in the base portion (42, 142, 242, 342) of the cover plate (12, 112, 212, 312).

6. A friction clutch according to claim 4, wherein the ratchet wheel (20) is controlled by the diaphragm (13, 213) through the control tongue (36).

7. A friction clutch according to claim 6, wherein the ratchet wheel (20) is controlled by an actuator element (29) consisting of a finger formed on the diaphragm (13) at its outer periphery.

8. A friction clutch according to claim 7, wherein two lugs (33) or bosses (133) are provided, being spaced apart circumferentially by a passage for the actuator element (29).

9. A friction clutch according to claim 8, wherein the lugs (33) or bosses (133) extend radially.

10. A friction clutch according to claim 6, wherein the control abutment (233, 333) consists of a lug formed by stamping out in the base portion (242, 342) of the cover plate (212, 312), which lug includes an end portion which extends axially and passes through a hole (252) in the diaphragm (213).

11. A friction clutch according to claim 1, wherein the ramp means (14) consist of an annular ring which includes, axially on one side, the ramps (16), which are inclined and spaced apart circumferentially, and, on the other side, the secondary abutment means (17).

12. A friction clutch according to claim 1, wherein the counter-ramp means (15) consist of pads adapted to cooperate with the ramps (16) of the ramp means (14).

13. A friction clutch according to claim 1, wherein the worm (23) is mounted for displacement along its axis, being subjected to the action of a resilient take-up means (46).

* * * * *